United States Patent
Rao et al.

(10) Patent No.: US 6,744,602 B2
(45) Date of Patent: Jun. 1, 2004

(54) MODIFIED GIMBAL TONGUE DESIGNS TO REDUCE PARTICLE SENSITIVITY

(75) Inventors: Ram Mohan Rao, Roseville, MN (US); Scott Edward Ryun, Prior Lake, MN (US); Zine Eddine Boutaghou, Vadnais Heights, MN (US); Adam Karl Himes, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 205 days.

(21) Appl. No.: 10/072,122

(22) Filed: Feb. 8, 2002

(65) Prior Publication Data

US 2003/0039075 A1 Feb. 27, 2003

Related U.S. Application Data

(60) Provisional application No. 60/314,523, filed on Aug. 22, 2001.

(51) Int. Cl.$^7$ .................................................. G11B 5/60
(52) U.S. Cl. ................................................... 360/245.3
(58) Field of Search ........................... 360/245.3, 245.6, 360/245.7

(56) References Cited

U.S. PATENT DOCUMENTS

| | | |
|---|---|---|
| 4,212,044 A | 7/1980 | Plotto |
| 4,486,798 A | 12/1984 | Feliss et al. |
| 4,510,541 A | 4/1985 | Sasamoto |
| 4,814,906 A * | 3/1989 | Suzuki et al. .................. 360/75 |
| 5,452,158 A * | 9/1995 | Harrison et al. .......... 360/245.3 |
| 5,467,238 A | 11/1995 | Lee et al. |
| 5,751,517 A | 5/1998 | Agarwal |
| 6,118,637 A * | 9/2000 | Wright et al. ............. 360/294.4 |
| 6,587,311 B1 * | 7/2003 | Niijima et al. ............... 360/255 |

* cited by examiner

*Primary Examiner*—Robert S. Tupper
(74) *Attorney, Agent, or Firm*—Merchant & Gould P.C.

(57) ABSTRACT

Herein is disclosed a method and apparatus for reducing particle collection on a slider or gimbal tongue. The gimbal tongue is shaped so as to interact with airflow within a disc drive to direct particles away from the slider and gimbal tongue. The leading edge of the gimbal tongue overhangs the leading edge of the slider. As air current approaches such a geometry, a large pocket of slow moving, high pressure air is created just upwind of the slider. Thus, as particulate matter encounters this pocket, the matter is slowed and its momentum is partially dissipated. A vent is provided in the gimbal tongue. The vent permits an escape route for the particles to move to an area of lower pressure, located on the other side of the gimbal tongue.

21 Claims, 11 Drawing Sheets

MODIFIED GIMBAL TONGUE DESIGNS TO REDUCE PARTICLE SENSITIVITY

RELATED APPLICATIONS

This application claims priority of U.S. provisional application Serial No. 60/314,523, filed Aug. 22, 2001 and entitled "MODIFIED GIMBAL TONGUE DESIGNS TO REDUCE PARTICLE SENSITIVITY."

FIELD OF THE INVENTION

This application relates generally to disc drives and more particularly to a gimbal tongue within a disc drive.

BACKGROUND OF THE INVENTION

The storage medium for a disc drive is a flat, circular disc capable of retaining localized magnetic fields. The data that are stored upon the disc find physical representation through these localized magnetic fields. The data are arranged on the disc in concentric, circular paths known as "tracks." The localized magnetic fields can be detected by a magnetically-sensitive head when they are brought in close proximity to the head.

Figure 1:
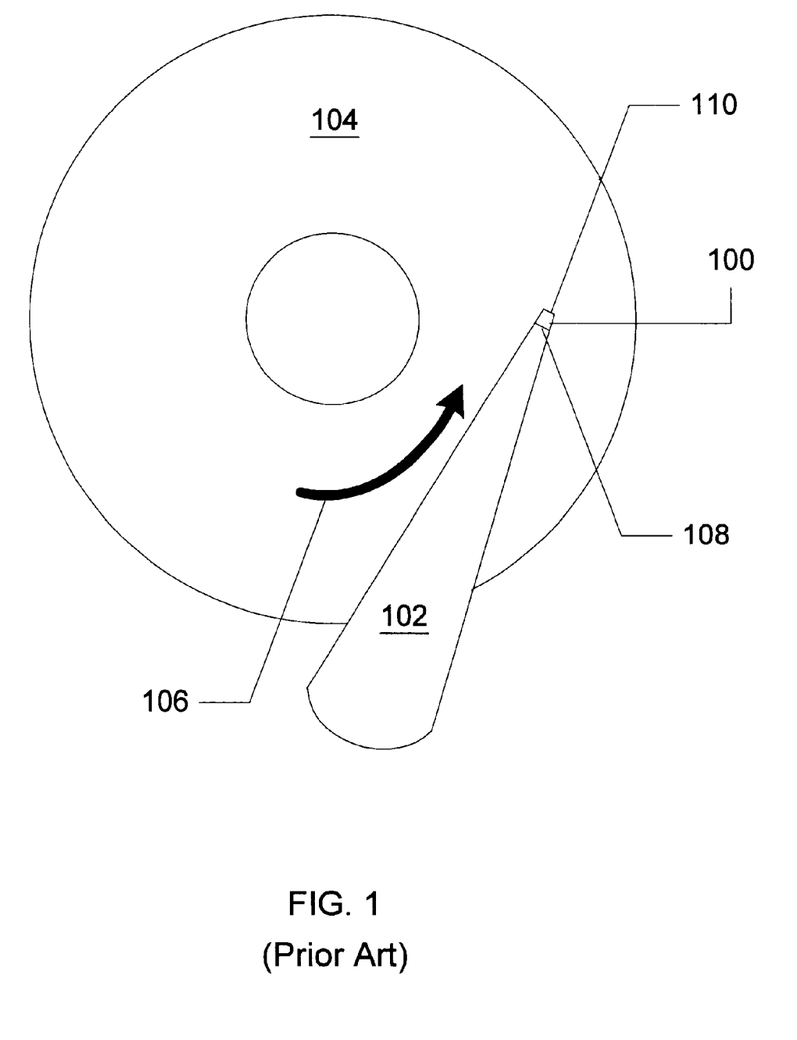
FIG. 1 depicts a simplified top view of an actuator arm assembly with an attached head, as known in the prior art.

The head is mounted upon the distal end of an actuator arm, which enables the head to move radially to address each track on the disc. This arrangement is generally depicted in FIG. 1, which shows a head 100 mounted upon the distal end of an actuator arm 102. As can be seen from FIG. 1, the disc 104 rotates in a counter-clockwise direction, creating an air current 106 that also rotates in a counter-clockwise direction with the disc 104. The air current 106 moves from the leading edge 108 of the head 100 to its trailing edge 110. The air current interacts 106 with an air-bearing surface (not shown) on the bottom of the head 100, thereby causing the head 100 to literally float at a small elevation over the surface of the disc 104.

Figure 2:
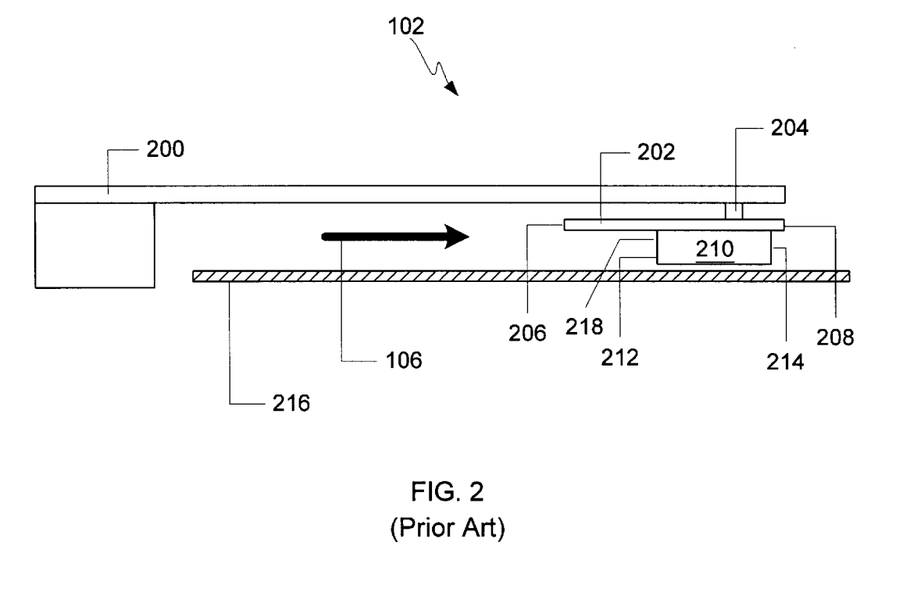
FIG. 2 depicts a simplified, cut-away side view of an actuator arm assembly with an attached gimbal tongue and slider, as known in the prior art.

FIG. 2 is a simplified cut-away side view that depicts, with greater detail, the arrangement presented in FIG. 1. As illustrated in FIG. 2, the actuator arm 102 includes, in part, a load beam 200, which is connected to a gimbal tongue 202 via a load point 204. The gimbal tongue 202 has a leading edge 206 and a trailing edge 208, as defined by the direction of the air current 106 (the leading edge 206 is upwind of the trailing edge 208). A slider 210 is adhered to the gimbal tongue 202; the slider 210 also possesses a leading edge 212 and a trailing edge 214. The magnetically-sensitive head 100 is located on the trailing edge 214 of the bottom surface of the slider 210. During operation, the head 100 is suspended in close proximity to the disc 216, so as to allow the head 100 to read and write the magnetic signals stored thereon.

The air current 106, which is generated by the rotation of the disc 216, carries with it particulate matter that contaminates the interior of the disc drive. Because the air current 106 is directed into the leading edge 212 of the slider 210, particulate matter collects on the leading edge 212. Particulate matter is particularly apt to collect on regions of the leading edge 212 that are proximate to the gimbal tongue 202 (because the gimbal tongue 202 and the slider 210 cooperate to form an inner corner 218 which traps particles).

In time, particles that have collected on the inner corner 218 or on the leading edge 212 of the slider 210 migrate, under the influence of gravity, operating shock, and/or shock vibration, to the bottom surface of the slider 210. Such migration is detrimental to the operation of the disc drive, because the particles, once on the bottom surface of the slider 210, serve as an abrasive that scratches the magnetic layer of the disc 216 and destroys the ability of the disc 216 to retain data. Worse still, if the particles migrate to the trailing edge 214 of the slider 210, they can destroy the magnetically-sensitive head 100, thereby rendering the disc drive unable to read any data, at all.

Based upon the foregoing discussion, it is evident that a need exists for a scheme by which to minimize the amount of particulate matter that collects upon either the inner corner 218 or leading edge 212 of the slider 210. Further, a desirable attribute for any such scheme is simplicity and inexpensiveness of implementation.

SUMMARY OF THE INVENTION

Against this backdrop the present invention has been developed. A gimbal tongue that reduces collection of particles upon an attached slider (or upon itself) possesses opposed first and second surfaces and possesses a leading and a trailing edge. The first surface is connected to a beam via a load point. The second surface is connected to a slider that also possesses a leading edge and a trailing edge. The leading edge of the gimbal tongue overhangs the leading edge of the slider, thereby defining an inner corner where the second surface of the gimbal tongue meets the slider. A slot penetrates the first and second surfaces of the gimbal tongue in a region between the leading edge of the gimbal tongue and the leading edge of the slider.

According to another embodiment of the invention, a method of reducing collection of particles on a gimbal tongue or upon a leading edge of a slider includes producing a region of slow air current in a region of space upwind from the gimbal tongue, thereby slowing the velocity of particles being carried by the air current. Additionally, the direction of travel of the particles carried by the air current is altered. Finally, the particles are vented from a first side of the gimbal tongue to a second side of the gimbal tongue.

According to yet another embodiment of the invention, a suspension assembly that reduces collection of particles includes a gimbal tongue attached to a slider and a means for venting particles being carried by the air current from a first side of the gimbal tongue to a second side of the gimbal tongue.

These and various other features as well as advantages which characterize the present invention will be apparent from a reading of the following detailed description and a review of the associated drawings.

DETAILED DESCRIPTION

Particle build-up on a slider (or upon an inner-corner defined by a slider and a gimbal tongue) may be reduced by shaping the gimbal tongue so as to interact with the airflow within the disc drive to direct particles away from the slider and gimbal tongue. The gimbal tongue may be designed so that its leading edge overhangs the leading edge of the slider. As an air current approaches such a geometry, a large pocket of slow moving, high pressure air is created just upwind of the slider. Thus, as particulate matter encounters this pocket, the matter is slowed and its momentum is partially dissipated. Additionally, a vent may be provided in the gimbal tongue. The vent permits an escape route for the particles (which have been slowed by the geometry they encounter) to move to an area of lower pressure, located on the other side of the gimbal tongue.

Figure 3:
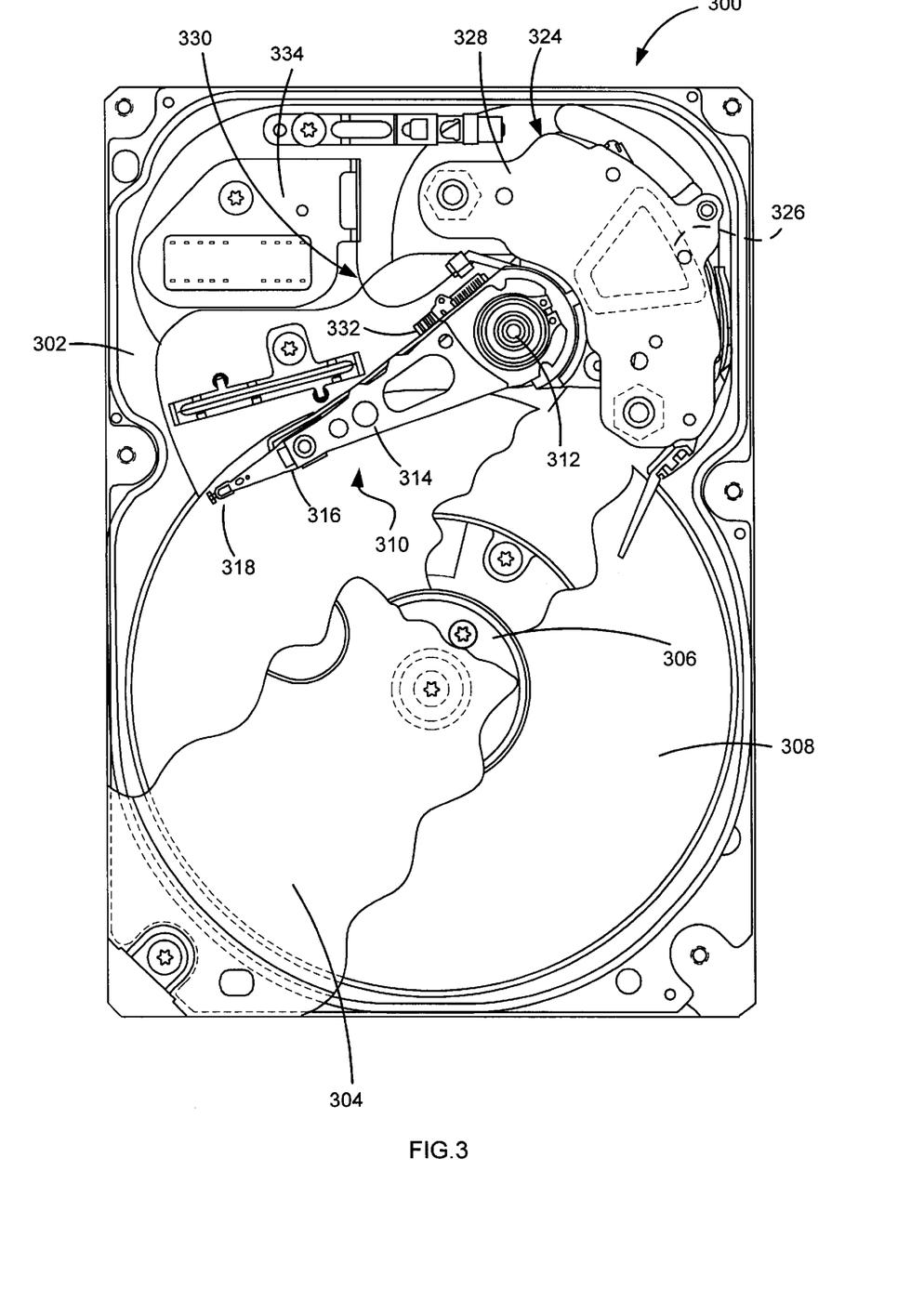
FIG. 3 depicts a cut-away top view of a disc drive, in accordance with one embodiment of the present invention.

In the disclosure that follows, the discussion associated with FIG. 3 is intended to familiarize the reader with a disc drive in a general way. The remainder of the discussion (and the remainder of the figures) focuses more particularly upon the slider and the design of the gimbal tongue.

A disc drive 300 constructed in accordance with a preferred embodiment of the present invention is shown in FIG. 3. The disc drive 300 includes a base 302 to which various components of the disc drive 300 are mounted. A top cover 304, shown partially cut away, cooperates with the base 302 to form an internal, sealed environment for the disc drive in a conventional manner. The components include a spindle motor 306 which rotates one or more discs 308 at a constant high speed. Information is written to and read from tracks on the discs 308 through the use of an actuator assembly 310, which rotates during a seek operation about a bearing shaft assembly 312 positioned adjacent the discs 308. The actuator assembly 310 includes a plurality of actuator arms 314 which extend towards the discs 308, with one or more flexures 316 extending from each of the actuator arms 314. Mounted at the distal end of each of the flexures 316 is a head 318 which includes an air bearing slider enabling the head 318 to fly in close proximity above the corresponding surface of the associated disc 308.

During a seek operation, the track position of the heads 318 is controlled through the use of a voice coil motor (VCM) 324, which typically includes a coil 326 attached to the actuator assembly 310, as well as one or more permanent magnets 328 which establish a magnetic field in which the coil 326 is immersed. The controlled application of current to the coil 326 causes magnetic interaction between the permanent magnets 328 and the coil 326 so that the coil 326 moves in accordance with the well-known Lorentz relationship. As the coil 326 moves, the actuator assembly 310 pivots about the bearing shaft assembly 312, and the heads 318 are caused to move across the surfaces of the discs 308.

The spindle motor 306 is typically de-energized when the disc drive 300 is not in use for extended periods of time. The heads 318 are moved over park zones near the inner diameter of the discs 308 when the drive motor is de-energized. The heads 318 are secured over the park zones through the use of an actuator latch arrangement, which prevents inadvertent rotation of the actuator assembly 310 when the heads are parked. Alternatively, some disc drives utilize load/unload ramps.

A flex assembly 330 provides the requisite electrical connection paths for the actuator assembly 310 while allowing pivotal movement of the actuator assembly 310 during operation. The flex assembly includes a printed circuit board 332 to which head wires (not shown) are connected; the head wires being routed along the actuator arms 314 and the flexures 316 to the heads 318. The printed circuit board 332 typically includes circuitry for controlling the write currents applied to the heads 318 during a write operation and a preamplifier for amplifying read signals generated by the heads 318 during a read operation. The flex assembly terminates at a flex bracket 334 for communication through the base deck 302 to a disc drive printed circuit board (not shown) mounted to the bottom side of the disc drive 300.

Figure 4:
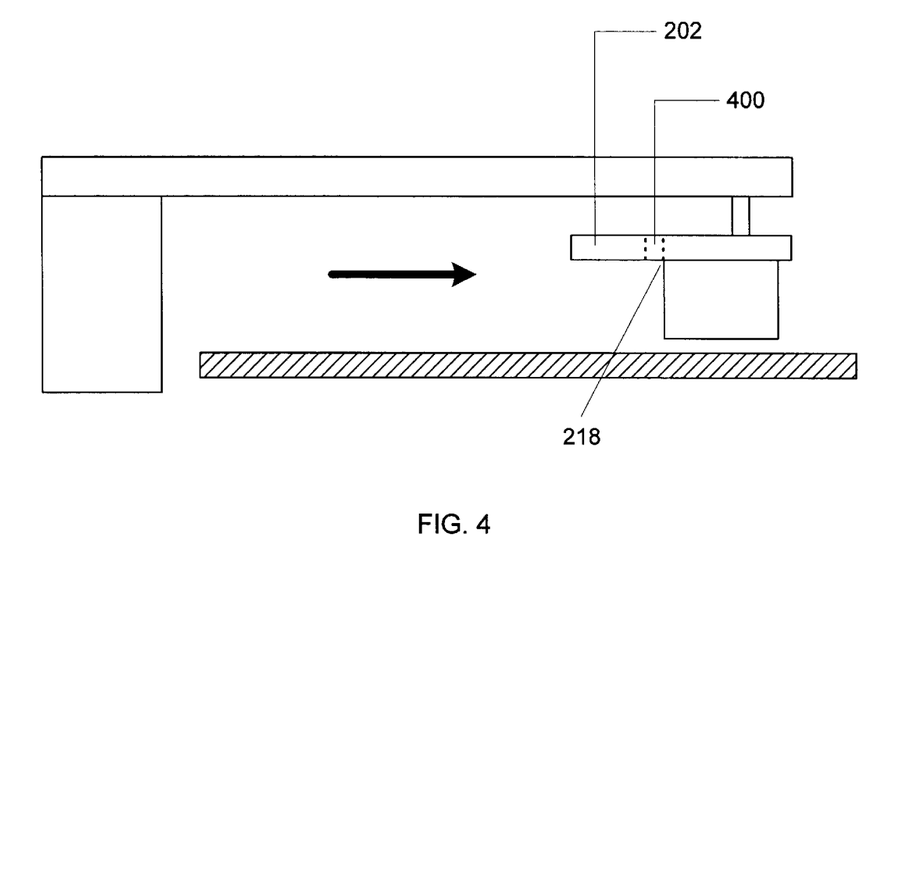
FIG. 4 depicts a simplified, cut-away side view of an actuator arm assembly with an attached gimbal tongue and slider, in accordance with one embodiment of the present invention.

As discussed above, rotation of the disc within the disc drive causes an air current that circulates in the same direction as the rotation of the disc. The air current carries particulate contaminants, which can collect on either the slider or the gimbal tongue, and which can eventually migrate to the bottom surface of the slider, causing damage to either the disc or the magnetically-sensitive head. As can be seen from FIG. 2, contaminants are particularly apt to collect in the inner-corner 218 defined by the gimbal tongue 202 and the slider 210. This phenomenon occurs because, at the inner-corner 218, the motion of the contaminant particles is restricted in two dimensions, leaving the particles free to travel along only one axis. Effectively, the particles become trapped in the inner-corner 218. Given this situation, one solution is to re-dimension the gimbal tongue 202 to have its leading edge 206 flush with the leading edge 212 of the slider 210, thus eliminating the inner-corner 218 altogether. Such a modification does reduce particle collection, but not as efficiently as retaining the overhanging leading edge 206 of the gimbal tongue 202 (and thus the inner-corner 218), while introducing a vent in the gimbal tongue through which particles may pass. This arrangement is depicted in FIG. 4, which shows a slot or vent 400 piercing the gimbal tongue 202. The vent 400 permits particles to escape the inner-corner 218.

Figure 5:
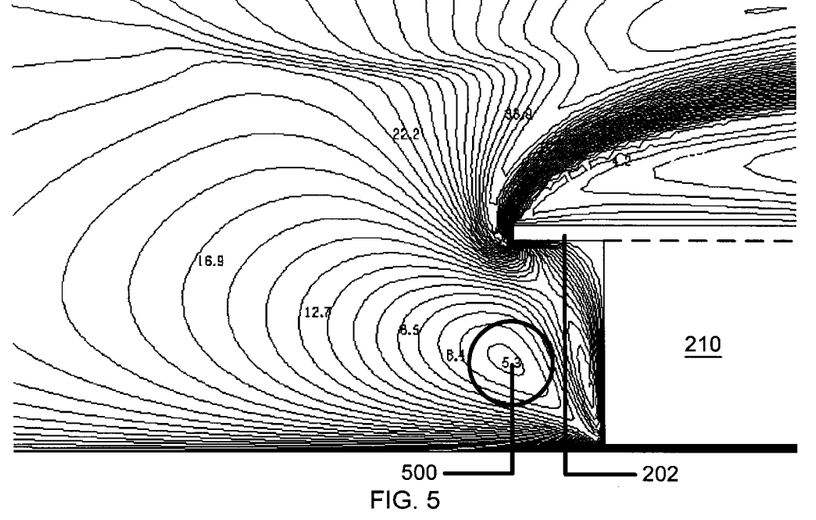
FIG. 5 depicts contours of airflow velocity in a disc drive employing an overhanging, unvented gimbal tongue.
Figure 6:
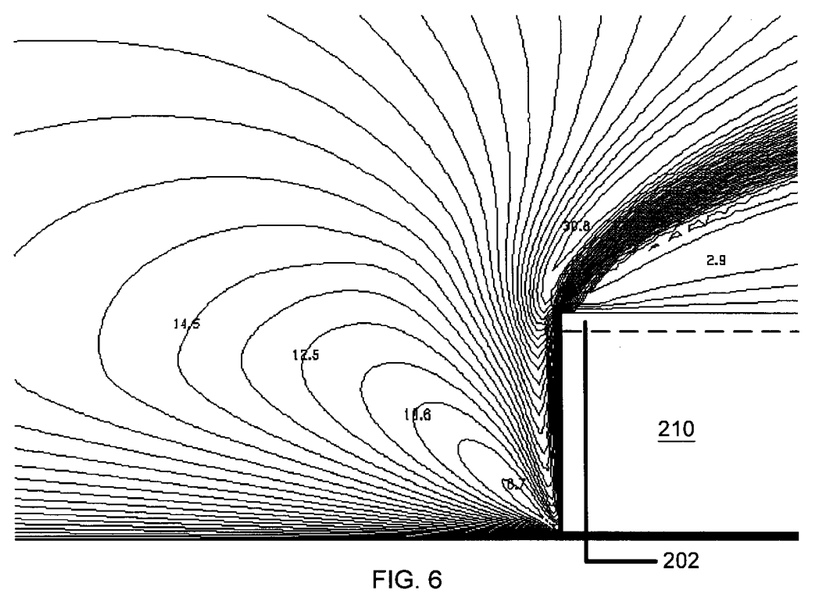
FIG. 6 depicts contours of airflow velocity in a disc drive employing a gimbal tongue with no overhang, in accordance with one embodiment of the present invention.

Based solely upon simple observation of the vented gimbal tongue 202 presented in FIG. 4, it may not be readily apparent why the venting scheme depicted therein is superior to having no overhanging gimbal tongue 202 at all. FIGS. 5 and 6 provide an explanation for the superiority of the vented scheme. FIG. 5 illustrates the airflow resulting from an overhanging gimbal tongue 202. Conversely, FIG. 6 illustrates the airflow resulting from a gimbal tongue 202 designed to be flush with the leading edge of the slider 210. FIGS. 5 and 6 contain isometric lines, which run through regions of space having equal air velocity. Several of the isometric lines are labeled with corresponding air velocities in meters per second. As is evident from FIG. 5, an overhanging gimbal tongue 202 results in a pocket of slow moving air (indicated by a circle that is identified by reference numeral 500) just up-wind of the slider 210. Notably, in FIG. 6, which depicts airflow in the absence of an overhanging gimbal tongue 202, a much smaller pocket exists. The significance of the large mass of slow-moving air 500 depicted in FIG. 5 is that, because contaminant particles are carried by the airflow, particles entering the region of slow moving air 500 are, themselves, slowed-meaning that their momentum is reduced. As a result of the partial dissipation of their momentum, the direction of travel of those particles is more easily altered, and they may be more easily turned away from the slider 210 and the gimbal tongue 202. If, as is the case in FIG. 6, the contaminant particles are permitted to retain a greater portion of their momentum as they approach the leading edge 212 of the slider 210, collision with the slider 210 becomes a likely event, even in the face of forces that might otherwise cause the particles to avoid the collision.

Figure 7:
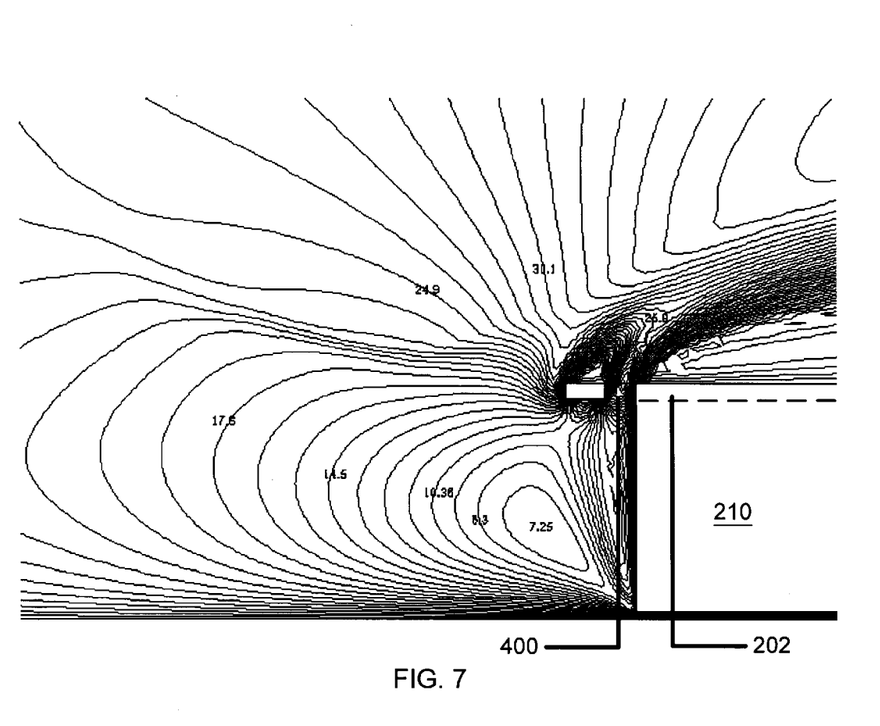
FIG. 7 depicts contours of airflow velocity in a disc drive employing an overhanging, vented gimbal tongue, in accordance with one embodiment of the present invention.
Figure 8A:
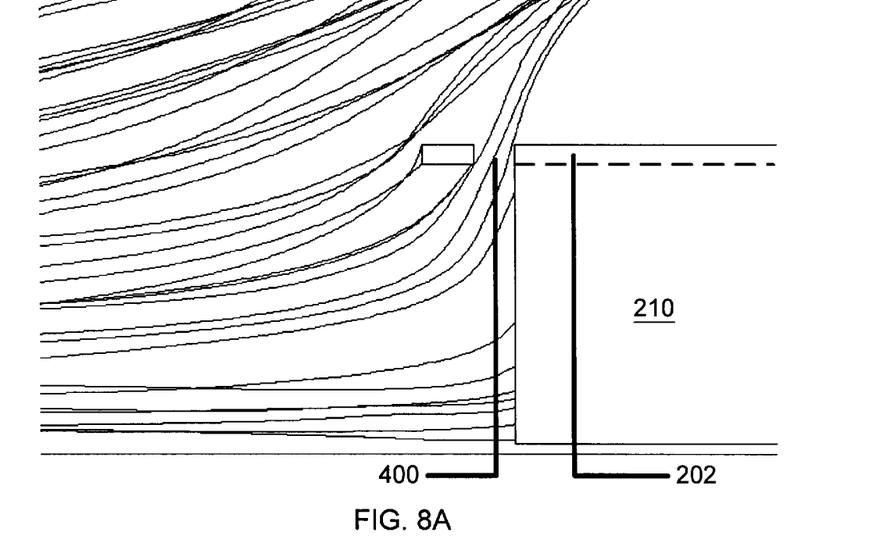
FIG. 8A depicts heavy particle paths in a disc drive employing an overhanging, vented gimbal tongue, in accordance with one embodiment of the present invention.
Figure 8B:
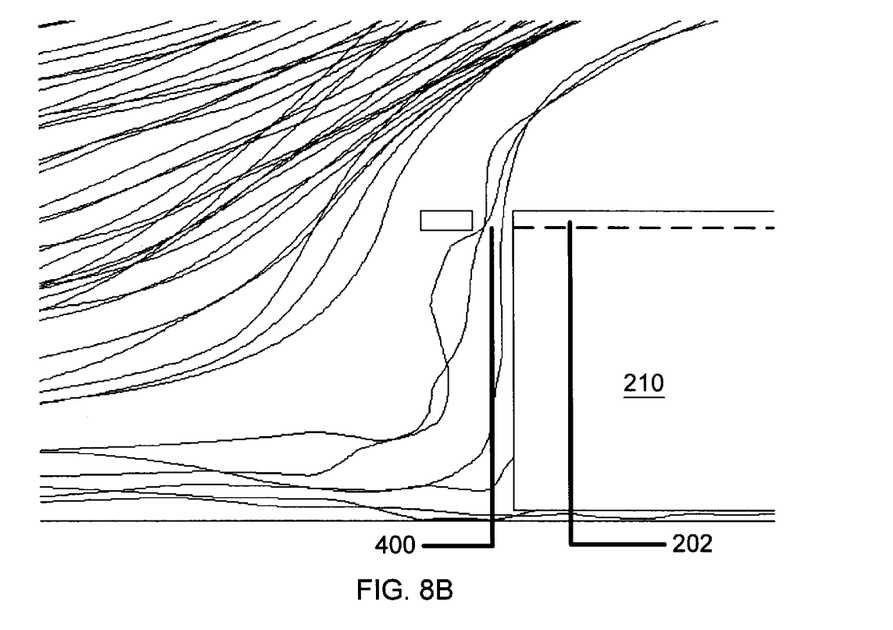
FIG. 8B depicts light particle flow in a disc drive employing an overhanging, vented gimbal tongue, in accordance with one embodiment of the present invention.
Figure 9:
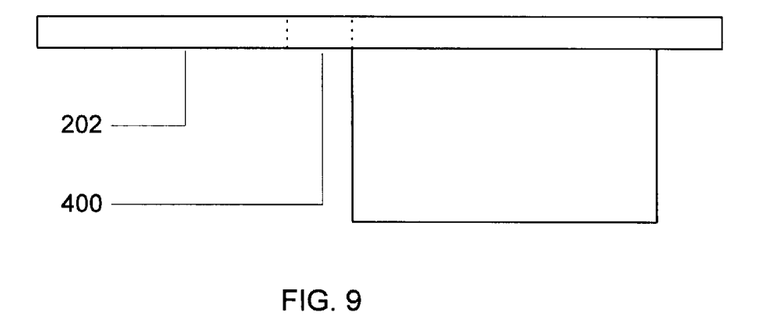
FIG. 9 depicts a vented, overhanging gimbal tongue, in accordance with one embodiment of the present invention.
Figure 10:
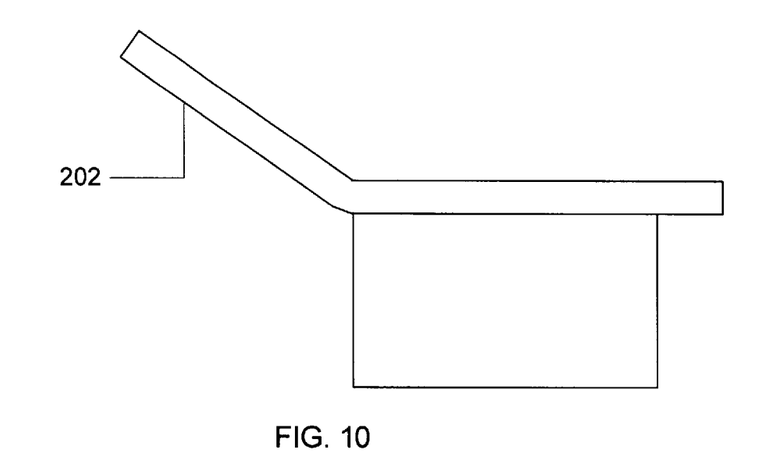
FIG. 10 depicts an unvented, overhanging gimbal tongue, in accordance with one embodiment of the present invention.
Figure 11:
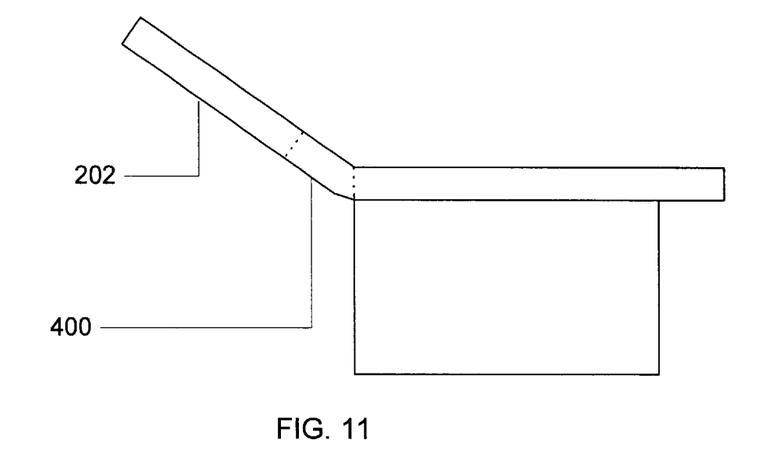
FIG. 11 depicts a vented, overhanging gimbal tongue, in accordance with one embodiment of the present invention.
Figure 12:
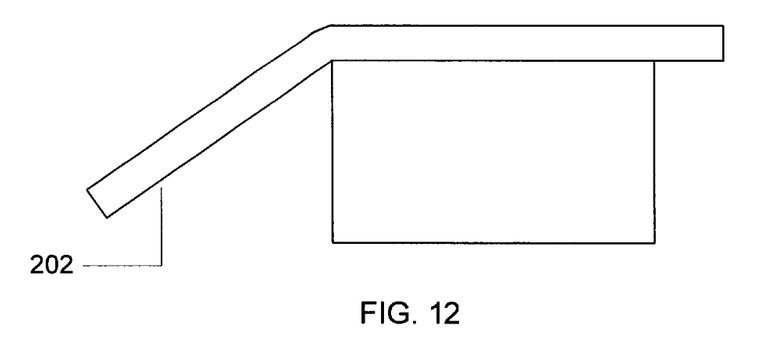
FIG. 12 depicts an unvented, overhanging gimbal tongue, in accordance with one embodiment of the present invention.
Figure 13:
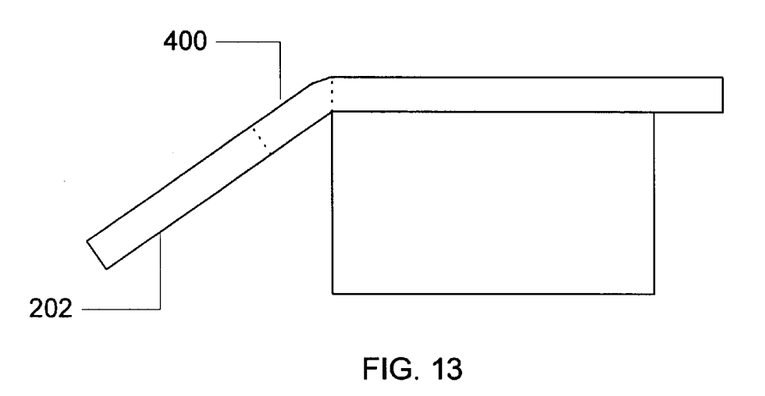
FIG. 13 depicts a vented, overhanging gimbal tongue, in accordance with one embodiment of the present invention.
Figure 14:
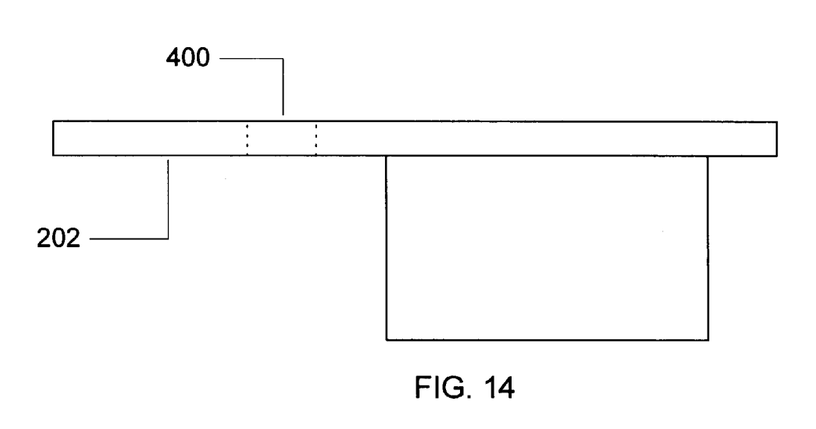
FIG. 14 depicts a vented, overhanging gimbal tongue, in accordance with one embodiment of the present invention.
Figure 15:
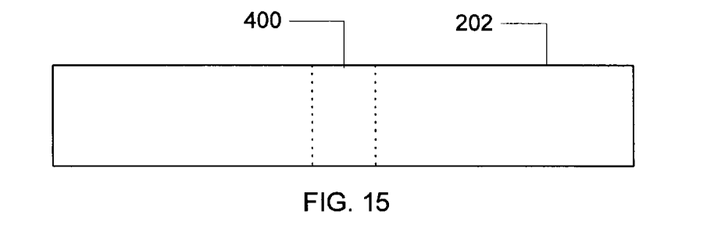
FIG. 15 depicts a vent profile in accordance with one embodiment of the present invention.
Figure 16:
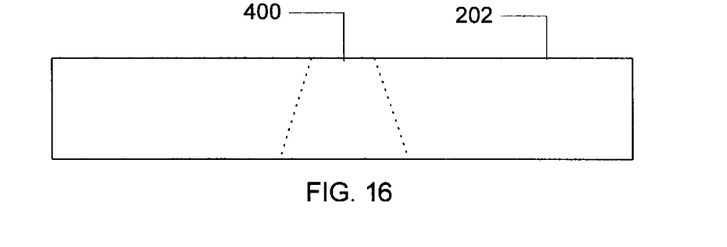
FIG. 16 depicts a vent profile in accordance with one embodiment of the present invention.
Figure 17:
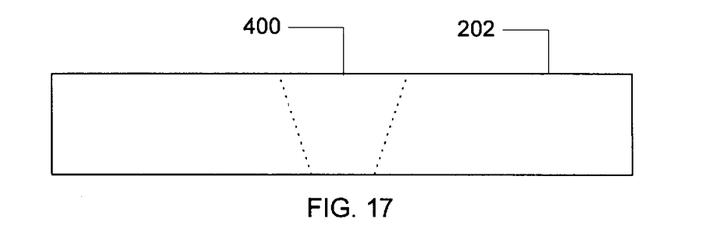
FIG. 17 depicts a vent profile in accordance with one embodiment of the present invention.
Figure 18:
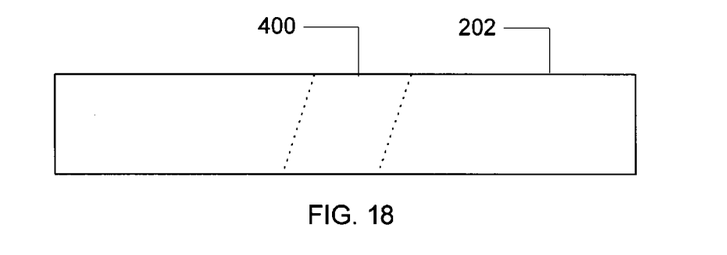
FIG. 18 depicts a vent profile in accordance with one embodiment of the present invention.
Figure 19:
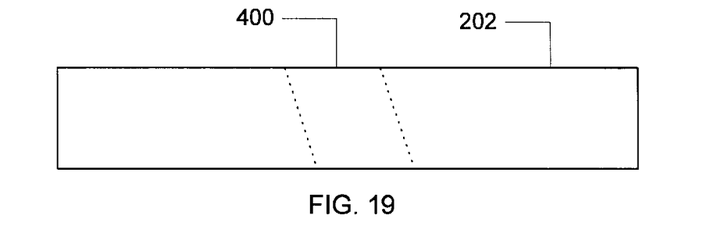
FIG. 19 depicts a vent profile in accordance with one embodiment of the present invention.
Figure 20:
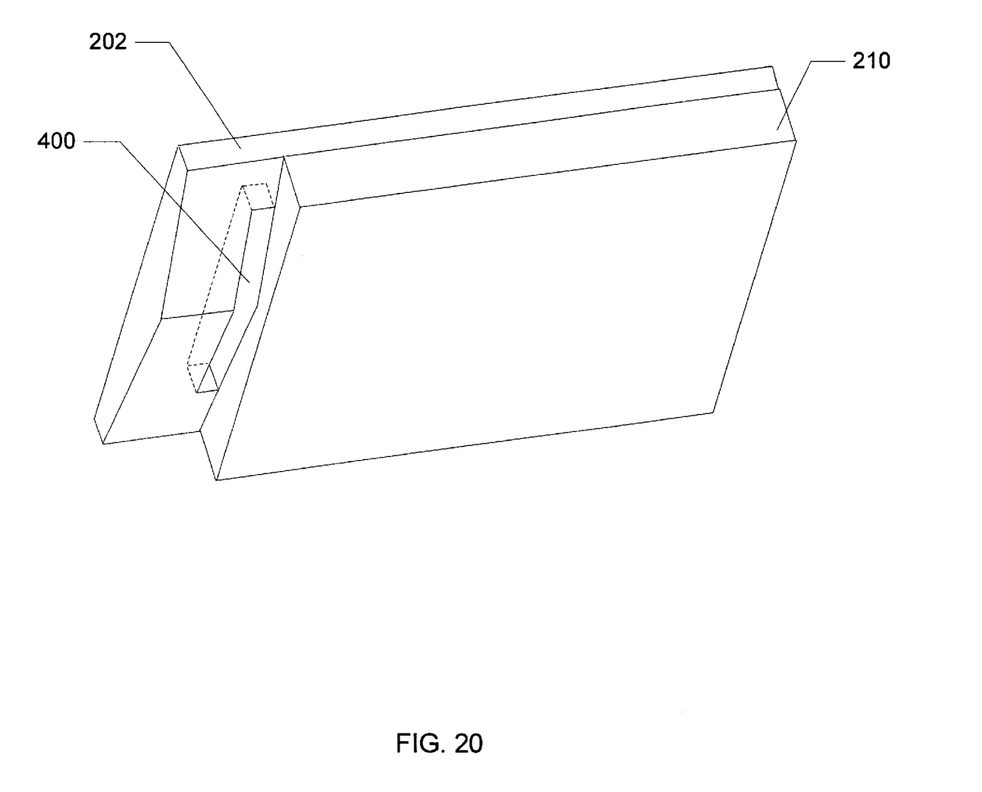
FIG. 20 depicts an underneath offset view of a chevron shaped gimbal tongue, in accordance with one embodiment of the present invention.

FIG. 7 illustrates the airflow resulting from an overhanging gimbal tongue 202 outfitted with a vent 400. Once again, FIG. 7 contains isometric lines running through regions of space having equal air velocities. As is evident from FIG. 7, airflow is slow in the region of space beneath the vent 400, but is fast in the region of space above the vent 400. This is discernible from the labeling of the isometric lines depicted on either side of the vent 400. In accord with the Bernoulli principle, it is known that fluid pressure drops as fluid velocity increases. Thus, as depicted in FIG. 7, fluid pressure (i.e., air pressure) drops across the vent 400. As derivable from FIG. 7, a vented 400 overhanging gimbal tongue 202 provides an escape route for airflow causing contaminant particles traveling with the flow of air to be drawn through the vent 400 and into the region of space above the gimbal tongue 202.

FIGS. 8A and 8B illustrate the path of travel of various contaminant particles as they approach a slider 210 and overhanging gimbal tongue 202 outfitted with a vent 400. FIG. 8A indicates the paths traveled by relatively large particles (1.0 microns in diameter). FIG. 8B indicates the paths traveled by relatively small particles (0.3 microns in diameter). As can be seen from FIGS. 8A and 8B, both large and small particles are carried by the aforementioned airflow through the vent 400. However, since the momentum of a body in motion is equal to its mass multiplied by its velocity, heavier particles (those depicted in FIG. 8A, for example) possess more momentum. As is evident from FIG. 8A, heavier particles are more difficult to turn than lighter particles. Despite the relatively great momentum possessed by the heavier particles, most of them are able to be directed through the vent 400, due to the twin forces of: (1) the creation of a mass of slow-moving, high-pressure air to partially dissipate the momentum of contaminant particles; and (2) the airflow that propels the contaminant particles through the vent 400. As is evident from FIG. 8B, a vast majority of the light-weight particles may be drawn through the vent 400. According to simulations, the vented, overhanging gimbal tongue scheme may reduce particle collection by as much as 25%, compared to the overhanging, unvented scheme known in the prior art (illustrated in FIG. 2). A scheme involving the elimination of the overhanging gimbal tongue reduces particle collection by 17%—a reduction that is not as significant.

Various embodiments of the vented or unvented gimbal tongue schemes may be used to influence: (1) the pressure gradient tending to draw the contaminant particles into the region of space above the gimbal tongue 202; or (2) the fluid resistance encountered by air as it evacuates the region of space beneath the gimbal tongue 202. These various embodiments are depicted in FIGS. 9–19.

As shown in FIGS. 9–14, the gimbal tongue 202 may be either vented (FIGS. 9, 11, 13, and 14) or unvented (FIGS. 10 and 12). Additionally, vented and unvented gimbal tongues 202 may be bent upwards (FIGS. 10 and 11), downwards (FIGS. 12 and 13), or left unbent (FIGS. 9 and 14). Further, the vent 400 may be juxtaposed to the leading edge 212 of the slider 210 or may be displaced therefrom, as shown in FIG. 14. In the bent gimbal tongue 202 embodiments shown in FIGS. 10–13, the gimbal tongue 202 may be made of a polyimide copper composite to create a bent gimbal tongue 202 without ruining flatness of the gimbal tongue 202, itself.

As shown in FIGS. 15–19, the vent 400 may be formed in various profiles. The vent 400 may be formed with interior walls that are perpendicular to the top and bottom surfaces of the gimbal tongue 202, as shown in FIG. 15. Alternatively, the vent 400 may be formed so as to become either progressively narrower (as shown in FIG. 16) or progressively broader (as shown in FIG. 17). Still further, the vent 400 may be formed so as to align with the airflow (as shown in FIG. 18) or to be angled away from the airflow (as shown in FIG. 19). Each of the embodiments depicted in FIGS. 15–19 may be used in conjunction with any of the vented gimbal tongue embodiments depicted in any of the preceding figures.

FIG. 20 depicts an underneath offset view of the gimbal tongue 202 and vent 400, according to one embodiment of the present invention. As can be seen from FIG. 20, the bottom surface of the portion of the gimbal tongue 202 that overhangs the slider 210 may be chevron shaped, so as to deflect airflow 106 around the gimbal tongue 202, in addition to venting airflow through its vent 400. Alternatively, the gimbal tongue 202 may be formed in a generally rounded, convex shape to achieve the same end.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the vent may take on shapes other than explicitly described herein, and the gimbal tongue may similarly take on shapes other than explicitly disclosed herein. Additionally, the gimbal tongue may be twisted or otherwise oriented in a manner other than explicitly disclosed herein. Numerous other changes may be made which will readily suggest themselves to those skilled in the art and which are encompassed in the spirit of the invention disclosed and as defined in the appended claims.

What is claimed is:

1. A gimbal tongue that reduces collection of particles on an attached slider, the gimbal tongue having opposed first and second surfaces and a leading and a trailing edge, the first surface being connected to a beam via a load point, the second surface being connected to the slider having a leading edge and a trailing edge, wherein:

the leading edge of the gimbal tongue overhangs the leading edge of the slider, thereby defining an inner corner where the second surface of the gimbal tongue meets the slider; and a slot penetrates the first and second surfaces in a region between the leading edge of the gimbal tongue and the leading edge of the slider.

2. The gimbal tongue of claim 1, wherein:

the slot is juxtaposed to the inner corner where the second surface of the gimbal tongue meets the slider.

3. The gimbal tongue of claim 1, wherein:

the slot is removed from the inner corner where the second surface of the gimbal tongue meets the slider.

4. The gimbal tongue of claim 1, wherein:

the gimbal tongue is a polyimide copper matrix.

5. The gimbal tongue of claim 4, wherein:

the inner corner, defined by the second surface of the gimbal tongue and the leading edge of the slide, is characterized by an angle; and the gimbal tongue is bent so that the angle is obtuse.

6. The gimbal tongue of claim 4, wherein:

the inner corner, defined by the second surface of the gimbal tongue and the leading edge of the slide, is characterized by an angle; and the gimbal tongue is bent so that the angle between the second surface of the gimbal tongue and the leading edge of the slider is acute.

7. The gimbal tongue of claim 2, wherein:

the gimbal tongue is a polyimide copper matrix.

8. The gimbal tongue of claim 7, wherein:

the inner corner, defined by the second surface of the gimbal tongue and the leading edge of the slide, is characterized by an angle; and the gimbal tongue is bent so that the angle is obtuse.

9. The gimbal tongue of claim 7, wherein:

the inner corner, defined by the second surface of the gimbal tongue and the leading edge of the slide, is characterized by an angle; and the gimbal tongue is bent so that the angle between the second surface of the gimbal tongue and the leading edge of the slider is acute.

10. The gimbal tongue of claim 1, wherein:

the slot is defined by an aperture on the first surface, and aperture on the second surface, and an inner tubular surface running between the aperture on the first surface and the aperture on the second surface; and the inner tubular surface of the slot is perpendicular to the first and second surfaces.

11. The gimbal tongue of claim 1, wherein:

the slot is defined by an aperture on the first surface, and aperture on the second surface, and an inner tubular surface running between the aperture on the first surface and the aperture on the second surface; and The aperture on the first surface is smaller than the aperture on the second surface.

12. The gimbal tongue of claim 1, wherein:

the slot is defined by an aperture on the first surface, and aperture on the second surface, and an inner tubular surface running between the aperture on the first surface and the aperture on the second surface; and The aperture on the first surface is larger than the aperture on the second surface.

13. The gimbal tongue of claim 1, wherein:

the slot is defined by an aperture on the first surface, and aperture on the second surface, and an inner tubular surface running between the aperture on the first surface and the aperture on the second surface; and the aperture on the first surface is nearer the inner corner, which is defined by the second surface of the gimbal tongue and the leading edge of the slide, than is the aperture on the second surface.

14. The gimbal tongue of claim 1, wherein:

the slot is defined by an aperture on the first surface, and aperture on the second surface, and an inner tubular surface running between the aperture on the first surface and the aperture on the second surface; and the aperture on the second surface is nearer the inner corner, which is defined by the second surface of the gimbal tongue and the leading edge of the slide, than is the aperture on the first surface.

15. The gimbal tongue of claim 1, wherein:

the second surface of the gimbal tongue is convex.

16. The gimbal tongue of claim 1, wherein:

the second surface of the gimbal tongue is formed in the shape of a chevron.

17. A suspension assembly that reduces collection of particles thereon, the assembly comprising:

a gimbal tongue attached to a slider; and a means for venting particles being carried by the air current from a first side of the gimbal tongue to a second side of the gimbal tongue.

18. The assembly of claim 17, wherein the means for venting particles further comprises a means for producing a pressure differential from the first side of the gimbal tongue to the second side of the gimbal tongue.

19. The assembly of claim 17, wherein the means for venting particles further comprises a means for directing airflow from the first side of the gimbal tongue to the second side of the gimbal tongue.

20. The assembly of claim 17, further comprising:

a means for directing the particles being carried by the air current around the gimbal tongue.

21. The assembly of claim 17, further comprising:

a vent defined by an aperture on the first surface, and an aperture on the second surface, and an inner tubular surface running between the aperture on the first surface and the aperture on the second surface.

* * * * *